United States Patent Office 3,573,077
Patented Mar. 30, 1971

3,573,077
GLASS-CERAMIC ARTICLE AND METHOD
George H. Beall, Corning, and Bruce R. Karstetter, Painted Post, N.Y., assignors to Corning Glass Works, Corning, N.Y.
No Drawing. Continuation-in-part of application Ser. No. 365,161, May 5, 1964. This application Feb. 4, 1969, Ser. No. 796,562
Int. Cl. C03c 3/22
U.S. Cl. 106—39
3 Claims

ABSTRACT OF THE DISCLOSURE

This invention relates to the strengthening of glass-ceramic articles wherein the crystal content thereof comprises the predominant portion and containing beta-quartz stuffed with magnesium ions as the principal crystal phase. The strengthening effect is accomplished through an ion exchange process taking place within a surface layer of the articles whereby lithium ions from an external source are exchanged for magnesium ions in the beta-quartz crystals to cause compressive stresses to be set up in the surface layer.

---

This application is a continuation-in-part of our pending application, Ser. No. 365,161, filed May 5, 1964, now abandoned.

A glass-ceramic article is produced through the carefully controlled crystallization in situ of a glass article. Hence, in manufacturing a glass-ceramic article, a glass-forming batch normally containing a nucleating agent is compounded, this batch is melted and the melt then cooled and shaped to a glass article of desired dimensions, and, thereafter, the glass article is exposed to a specific heat treatment which causes nuclei to be first developed in the glass which acts as sites for the subsequent growth of crystals thereon as the heat treatment is continued.

Since this crystallization in situ is the result of essentially simultaneous growth of innumerable nuclei, a glass-ceramic article consists of relatively uniformly-sized, fine-grained crystal homogeneously dispersed in a residual glassy matrix, the crystal comprising the predominant portion of the article. Thus, glass-ceramic articles are commonly defined as having a crystal content in excess of 50% by weight and, frequently, are actually greater than 90% by weight crystalline. In view of this very high crystallinity, a glass-ceramic article normally exhibits chemical and physical properties varying quite consideraly from those of the parent glass and which are more nearly characteristic of those exhibited by a crystalline article. Finally, the very high crystallinity of the glass-ceramic article leaves a residual glassy matrix of a different composition from that of the parent glass inasmuch as the components constituting the crystals will have been precipitated therefrom.

For an extensive discussion of the theoretical concepts and the practical considerations involved in the manufacture of glass-ceramic articles, as well as a description of the physical structure thereof, reference is hereby made to U.S. Pat. No. 2,920,971. As can be easily appreciated, the crystal phases grown in glass-ceramic articles are dependent upon the composition of the original glass and the heat treating schedule to which the glass article is exposed. Glass-ceramic articles wherein beta-quartz "stuffed" with magnesium ions constitutes the principal crystal phase and a method for producing such articles are disclosed in U.S. Pat. No. 3,252,811, filed Dec. 11, 1963 in the name of one of us, G. H. Beall, and assigned to a common assignee.

The diffusion of ions in any medium is a direct function of the structure of the medium itself. Hence, whereas a crystal has a long range ordered structure of ions, glass has only short range order and has even been deemed to consist of a random network of ions. This basic difference in structure greatly affects the ability of ions to diffuse therein.

The structure of glass is characterized by a network or framework composed of polyhedra of oxygen centered by small ions of high polarizing power (e.g. $Si^{+4}$, $B^{+3}$, $Al^{+3}$, $Ge^{+4}$, $P^{+5}$). These polyhedra are arranged in a generally random fashion so that only short range order exists. Thus silica glass is thought to be composed of a random network of $SiO_4$ tetrahedra, all of whose corners are shared with one another. In silicate glasses containing modifying oxides (e.g. $Na_2O$, $K_2O$, $MgO$, $CaO$, $BaO$, etc.) some of the shared corners (Si—O—Si bonds) are believed broken and oxygen ions are formed which are connected to only one silicon ion. The modifying ions remain in interstitial positions or structural vacancies. In modified aluminosilicate glasses, nonbridging oxygen ions are believed less common because as modifying ions are added to silicate glasses aluminum replaces silicon in the three-dimensional corner shared tetrahedral network and the modifying ions remain in the interstices with the retention of charge balance.

In either case the larger ions of lower valence (modifiers) are thought to occur geometrically in interstitial positions within the basic silicate or aluminosilicate framework. They can thus be considered as completely or at least partially surrounded by linked framework silica tetrahedra. In other words, these ions can be considered as present in "structural cages" in the network.

Since the glassy network is random, the size of these cages or potential modifier cation positions is variable and the number of cases is large with respect to the number of modifying ions. Therefore, it is likely that during ion exchange in a molten salt bath a small ion will jump out of a cage and a large ion will jump into another cage, very possibly a larger one. Even if the exchangeable ion in the glass and the ions in the molten salt are similar in size, it is likely that an ion leaving one cage will be replaced by an ion entering a different and previously vacant cage. Thus ion exchange phenomena in a glassy network are structurally random and there is no guarantee that certain structural vacancies or positions filled before exchange will be filled after exchange.

The concept of exchanging ions within a crystal structure has been appreciated for many years. The term "ion exchange," as commonly used, refers to replacement reactions in clay and zeolite-type materials carried out in aqueous solutions at temperatures below 100° C. These materials generally consist of alternating, parallel, essentially two-dimensional layers which are stacked together with interlayer spaces therebetween. To maintain electroneutrality between these layers, cations are incorporated into the interlayer spaces. The extent and rate of exchange in these materials is a function not only of the concentrations of the exchanging species but also of the structure of the crystalline phase undergoing exchange. When these materials are suspended in an aqueous solution which can penetrate between the layers, these cations are freely mobile and can exchange with cations present in the solution. Hence, the cation exchange capacity of these materials arises principally from the replacement of cations at defined positions in the interlayer spaces. These interlayer spaces can be likened to channels and it will be apparent that this type of low temperature ion exchange will occur between the loosely bonded ions in a crystal and those in a solution only if there is a suitable channel within the crystal to allow diffusion to take place.

Isomorphous substitution in crystals involves the replacement of the structural cations within the crystal lattice by other cations. This type of substitution may be regarded as a form of ion exchange but the accomplishment thereof requires crystallizing the materials from melts of the appropriate composition. However, the amount and type of isomorphous substitutions can often be very important in affecting the character of a material which is to be subsequently subjected to the conventional low temperature ion exchange reaction described above.

The instant invention contemplates the use of high temperature ion exchange to effect substitutions within the crystalline lattice to thereby produce materials similar to those secured through isomorphous substitution. However, in contrast to glasses, high temperature ion exchange in crystals is much more restricted. The various ion species are specifically located in defined positions within the lattice. When an ion leaves a crystalline position, the position is generally filled by another ion from an external source of ions. The geometry of the crystals often restricts the size of the replacing ion. Isomorphous substitution in the crystal can only sometimes be of help in determining which ion pairs are exchangeable under the rigid conditions imposed by the long range repetitive order of crystals. Thus, for example, sodium ions can replace lithium ions in the beta-spodumene crystal structure but this exchange cannot take place in the beta-quartz or beta-eucryptite solid solution structure where the sodium ion appears to be too large for the structure to tolerate and the crystalline structure is destroyed if the exchange is forced to take place. As opposed to this, the sodium-for-lithium ion exchange can always be carried out in aluminosilicate glasses without any phase change.

Hence, in short, crystals, because of their definite geometry, impose stringent limitations upon ion exchange. Glasses, on the other hand, because they are random structures capable of incorporating almost all chemical species in a substantial degree, demonstrate no such basic restrictions.

Of course, the ability of a crystalline phase to accept another cation to replace an ion already in its structure through an ion exchange mechanism is not necessarily useful. Many such exchanges will not lead to compressive stress and consequent strengthening. When strength is the desired goal, it is necessary to tailor the exchange to produce compressive stress in the exchanged layer. The compressive stress may arise through crowding of the existing structure or through transformation of that structure to one which comes under compression by some other mechanism; e.g., difference in coefficients of thermal expansion or density changes.

The term, "beta-quartz," has been employed to designate a hexagonal trapezohedral form of silica ($SiO_2$) that is stable from 573–870° C. and that is further characterized by a slightly negative coefficient of thermal expansion and a very low birefringence. It has been shown that this crystal and that known as beta-eucryptite $$(Li_2O \cdot Al_2O_3 \cdot 2SiO_2)$$

form a complete series of solid solutions. These solid solutions have been referred to as "stuffed derivatives" of beta-quartz by Buerger in his article, The Stuffed Derivatives of the Silica Structures, Am. Mineral, 39, 600–14 (1954). The author ascribes to these solid solutions a structure wherein some of the tetrahedral silicon ions in normal beta-quartz are replaced by aluminum ions and the resulting electrical charge deficiency is satisfied by "stuffing" the interstitial vacancies in the double helicoid silica structure with lithium ions.

It has since been shown that other ions such as the magnesium ion may also be "stuffed" in the silica structure either alone or in conjunction with the lithium ion. For example, a publication by Schreyer, W. and Schairer, J. F., Metastable Solid Solutions with Quartz-Type Structures on the Join $SiO_2$—$MgAl_2O_4$, Geophys. Lab. Paper No. 1357 (1961), shows that a series of metastable beta-quartz solid solutions can be formed along the join $SiO_2$—$MgAl_2O_4$. In this case, aluminum for silicon substitution is accompanied by magnesium stuffing of beta-quartz interstitial vacancies. Only one $Mg^{2+}$ ion is required per $2Al^{3+}$ for $2Si^{4+}$ substitutions in this instance, whereas $2Li^+$ ions are required in the beta-eucryptite case. This magnesium series of solid solution crystals has been identified as the "mu-cordierite" series.

The previously mentioned Beall patent discloses glass-ceramic materials in which the predominant crystal phase has been identified as composed of beta-quartz crystals "stuffed" with $Mg^{++}$ with or without $Li^+$ or $Zn^{++}$ ions. On the basis of the precedent mineral terminology, these glass-ceramic materials have been identified as "stuffed" beta-quartz glass-ceramics. Specifically, the all-magnesium ion stuffed materials are designated as "mu-cordierite" glass-ceramics.

While the Beall patent is primarily concerned with a limited range of compositions which provide a transparent crystal phase, it will be appreciated that this is not a characteristic of all "stuffed" beta-quartz glass-ceramics. Rather, the composition range encompassing such materials is considerably broader than that which describes the transparent type material. Accordingly, the terminology practice of the Beall patent is followed here and extended to include all glass-ceramics having a corresponding "stuffed" beta-quartz crystal structure regardless of the feature of transparency.

Chemical alteration in situ of the crystal phase in a glass-ceramic material by cation exchange is generally disclosed and claimed in an application filed May 5, 1964, Ser. No. 365,117 in the name of R. O. Voss, now abandoned. This application is entitled "Glass-Ceramic Article and Method," and is assigned to a common assignee. In addition to its general disclosure regarding ion exchange in a glass-ceramic material, the Voss application specifically discloses the strengthening of a glass-ceramic article having a beta-spodumene crystal phase. The strengthening is achieved by exchanging the lithium ion of such crystal phase for a sodium ion within a surface layer on the article to develop compressive stress within such surface layer.

We have now discovered that the magnesium ion in a magnesium stuffed beta-quartz glass-ceramic material is exchangeable with lithium ions and enters into an exchange whereby two lithium ions replace one magnesium ion within the crystal structure. We have further found that this exchange can be accomplished regardless of whether the beta-quartz crystal is stuffed entirely with magnesium ions or jointly with magnesium and lithium ions. We are unable to definitely explain the surprising capability of the divalent magnesium ion to undergo exchange in the present material, but surmise that it is related to the manner in which the "stuffed" ions are held within the beta-quartz crystal structure.

From a practical standpoint, it is particularly significant to find that this ion exchange results in the development of compressive stresses within a surface layer on the glass-ceramic article and thereby strengthens the article. The precise manner in which stress develops from the ion exchange has not been definitely ascertained. However, there are two apparent probable explanations. The first is a change in the average thermal coefficient of expansion that is observed. Thus, in a composition containing about 70% $SiO_2$, a mu-cordierite type glass-ceramic will have an expansion of about $30 \times 10^{-7}$/° C., whereas the corresponding lithian glass-ceramic (i.e. total magnesium content replaced by lithium) has an expansion around zero. Accordingly, treatment of magnesium-containing, beta-quartz glass-ceramics in a lithium-containing bath to cause two lithium ions to exchange for a magnesium ion in the interstitial or "stuffing" positions of the crystal might be expected to cause surface compression to develop as the essentially crystalline and rigid glass-ceramic cools from about 800° C. to room temperature.

The second explanation relates to the effect of the ion exchange on the unit cell volume of a beta-quartz crystal. According to the previously mentioned article by Schreyer and Schairer, there is a much greater expansion of the beta-quartz unit cell as lithium and aluminum ions enter the silica structure than when the corresponding entry of magnesium and aluminum ions occurs. This is associated with a density effect in the crystal material. Consequently, expansion of the unit cell of a beta-quartz solid solution crystal might be expected when two lithium ions replace one magnesium ion. Assuming an increase in unit cell volume does occur, such increase would undoubtedly contribute compressive stresses, and consequent strengthening, in the ion exchanged surface layer on the article.

Our invention, then, is a glass-ceramic article having a beta-quartz crystal phase stuffed with magnesium ions and characterized by a compressively stressed surface layer in which at least a portion of the magnesium ions is replaced by lithium ions. It further resides in a method whereby a compressively stressed surface layer of modified chemical composition is synthesized on a glass-ceramic article having a magnesium stuffed beta-quartz crystal phase by replacing a portion of the magnesium ions in such surface layer by lithium ions.

In the practice of the present invention, any beta-quartz type glass-ceramic wherein the beta-quartz crystal is stuffed with magnesium ions may be employed. The invention is not concerned with, or limited by, the composition or method of production of the glass-ceramic, except to the extent that the crystal phase must contain magnesium ions in a stuffing position. In particular, the invention is not limited to the transparent materials disclosed in the previously mentioned Beall patent. It is, however, described with reference to such compositions because they represent a preferred embodiment and are illustrative of the generic family of compositions except for their unique property of transparency.

To understand why $2Li^+ \rightleftarrows Mg^{++}$ ion exchange can take place in a stuffed $\beta$-quartz glass-ceramic, it is necessary to examine the structure of this phase. The hexagonal trapezohedral form of pure silica, $\beta$-quartz, is composed structurally of a three-dimensional array of silica tetrahedra arranged along hexagonal screw axes parallel to the C axis in double helical fashion. Substitutions of $Al^{+3}$ ions for $Si^{+4}$ ions in the $\beta$-quartz network must be accompanied by ions of suitable size to fit into the interstitial vacancies along the hexagonal screw axes. These are primarily $Li^+$ and $Mg^{++}$ ions, which are pseudo-octahedrally co-ordinated, in contrast to the network-forming $Al^{+3}$ and $Si^{+4}$ ions which are held in tight tetrahedral co-ordination. In general, at least one interstitial cation per eight network tetrahedra is required to prevent inversion to $\alpha$-quartz on cooling, but one cation per two tetrahedra is necessary to completely fill the structure (i.e. in the case of stoichiometric $\beta$-eucryptite, $LiAlSiO_4$).

Because all of the $\beta$-quartz solid solutions which form the major phase in the glass-ceramics of this invention are less than "half-filled" (i.e. less than one interstitial cation per four network tetrahedra), $2Li^+ \rightleftarrows Mg^{++}$ ion exchange is possible without altering the basic quartz structure, even in the case of pure magnesium compositions. This allows such exchange to take place in the case of these solid solutions in contrast to other magnesium silicates where all the potential sites for ions of the size of $Li^+$ or $Mg^{++}$ are completely filled with $Mg^{++}$ ions (e.g. enstatite—$MgSiO_3$, cordierite—$Mg_2Al_4Si_5O_{18}$). In such silicates there is no room for one half of the $Li^+$ ions of a possible $2Li^+ \rightleftarrows Mg^{++}$ exchange.

Furthermore, the $2Li^+ \rightleftarrows Mg^{++}$ exchange is practical at low temperatures (800°–900° C.) in the case of $\beta$-quartz solid solutions, because $Mg^{++}$ in octahedrally co-ordinated interstitial positions along the helical channels is mobile at these temperatures. Tetrahedrally co-ordinated $Mg^{++}$ in such phase as spinel ($MgAl_2O_4$) is not mobile until temperatures in the 1000° C. vicinity are approached.

Therefore, based upon the extensive isomorphous substitution capabilities of $\beta$-quartz solid solution, the large proportion of vacant interstitial sites, and the high mobility of $Mg^{++}$ ions in these "loose" sites at fairly low temperatures, $2Li^+ \rightleftarrows Mg^{++}$ ion exchange is possible in $\beta$-quartz solid solution glass-ceramics.

As disclosed in the Beall patent, a magnesium stuffed beta-quartz glass-ceramic may be produced by melting at temperatures on the order of 1600°–1800° C. a suitably selected and proportioned glass batch capable of providing, in addition to the essential oxides of magnesium, aluminum and silicon, zirconia ($ZrO_2$) and/or titania ($TiO_2$) as a nucleating agent and, optionally, lithia ($Li_2O$) and zinc oxide ($ZnO$). The glass is melted and formed in accordance with suitable known glassworking practices and then converted to the glass-ceramic state by suitable heat treatment within the range of 750°–1150° C. To permit development of a fine-grained, high quality, crystalline body without deformation, the heat treatment preferably involves holding the article at selected temperatures within the given range for periods of time to permit nucleation and crystal development to proceed fully.

In accordance with the present invention, such a glass-ceramic article is brought into contact with a material containing an exchangeable lithium ion, any ionizable salt or mixture being suitable. Thus, the lithium ions are deemed exchangeable since they are capable of migrating or diffusing in depth under a chemical force such as is supplied by a differential ion concentration or under a physical force such as heat and/or electrical potential which are controllable by the application or removal of such forces or attainment of an equilibrium. The material is maintained in contact with the glass-ceramic at a temperature such that exchange occurs between the magnesium ion of the glass-ceramic and the lithium ion and for a suitable time to effect a desired degree of exchange. The ion exchange reaction is a diffusion-type process and, therefore, the amount of exchange increases with the square root of time.

The rate of exchange increases with temperature and relatively high temperatures are required to effect an optimum degree of strengthening in the present glass-ceramic articles in any reasonable time. Accordingly, we prefer to employ temperatures on the order of 800° C. and above. Higher temperatures hasten the rate of exchange, but it is generally difficult to find a salt solution that does not unduly attack either the glass-ceramic material being treated or available container and handling equipment.

The invention is not limited to the use of molten salt baths. However, a particularly convenient and effective means of achieving intimate contact is by immersing the glass-ceramic article in such a bath. A particularly effective bath is one containing a major proportion of lithium sulfate and a minor proportion of a sodium or potassium sulfate or acid sulfate.

The amount of ion exchange increases with time as well as temperature. However, at some point an optimum strength is reached so that further exchange adds no significant strength increase. This point will depend on a number of factors, but to a large extent on the degree of abrasive treatment given the surface or which it must be expected to withstand. Thus, a surface severely abraded by tumbling in contact with silicon carbide particles may require 4–16 hours treatment at temperatures of 800°–850° C. to attain a maximum strength which is then referred to as the tumble abraded strength of the article.

By way of further illustrating the invention, a number of specific embodiments are now described.

The following table sets forth, by way of illustration, a series of oxide compositions representing glasses which, upon proper heat treatment, will produce beta-quartz glass-ceramics. In the glass-ceramic materials thus produced, the beta-quartz crystals will be stuffed with magnesium ions alone or in conjunction with lithium and/or zinc ions depending on the composition. The oxide compositions are presented in parts by weight and are the formulations employed to calculate a glass batch for melting purposes.

TABLE I

|  | 1 | 2 | 3 | 4 | 5 | 6 | 7 | 8 | 9 |
|---|---|---|---|---|---|---|---|---|---|
| $SiO_2$ | 70 | 70 | 70 | 70 | 50 | 42 | 40 | 70 | 55 |
| $Al_2O_3$ | 20 | 22 | 22 | 20 | 29 | 33 | 35 | 21 | 32 |
| MgO | 9 | 6 | 6 | 3 | 12 | 13 | 14 | 7 | 13 |
| ZnO |  |  |  | 5 |  |  |  |  |  |
| $Li_2O$ |  | 2 | 2 | 2 |  |  |  | 2 |  |
| $ZrO_2$ | 8 | 5 | 4 | 5 | 9 | 11 | 11 | 5 |  |
| $TiO_3$ |  |  |  |  |  |  |  |  | 10 |

A glass batch was formulated on the basis of each of these compositions and melted for 16 hours at a maximum temperature of 1600°–1650° C. The glass from each melt was worked into quarter-inch cane which was then cut into 4 inch lengths for strength testing purposes. These glass cane samples were then cerammed, that is converted to the glass-ceramic state by heat treatment adapted to separate a "stuffed" beta-quartz crystal phase from and within the glass.

Table II, which follows, presents in outline form the ceramming schedule employed for each glass and the average thermal coefficient of expansion of the cerammed material produced from such glass by the indicated heat treatment. In Examples 1–4 and 9, the glass was heated to the first indicated temperature at furnace rate of about 300° C./hr. It was then held at that temperature for the time indicated in hours; again heated at furnace rate to the higher indicated temperature; again held for the indicated time in hours; and then cooled. Examples 5–7 differed in that they had a single short hold time followed by a slower heating rate to maximum temperature. Example 8 was held at three different temperatures for four hours each with a heating rate of 300° C./hr. between holds.

TABLE II

| Sample: | Temperature, ° C. | Time | Exp.×10⁻⁷ (0°–300° C.) |
|---|---|---|---|
| 1 | 900 | 4 | 29.5 |
|  | 970 | 6 |  |
| 2 | 800 | 4 | 19.0 |
|  | 880 | 6 |  |
| 3 | 800 | 6 | 18.5 |
|  | 900 | 6 |  |
| 4 | 770 | 2 | 6.5 |
|  | 890 | 6 |  |
| 5 | 800 | 1 | 40 |
| 6 | (¹) |  | 6 |
| 7 | (¹) |  | 48 |
| 8 | 780 | 4 | 40 |
|  | 800 | 4 |  |
|  | 860 | 4 |  |
| 9 | 800 | 4 | 40 |
|  | 880 | 4 |  |

¹ Heat 200° C./hour to 1,060° C., cool rapidly.

The body of the crystallized cane of each example was studied through X-ray diffraction analysis and transmission and replica electron microscopy. The cane samples were determined to be greater than 70% by weight crystalline wherein stuffed beta-quartz constituted by far the predominant crystal phase. In Examples 1–8, minor amounts of cubic zirconia, gahnite, and spinel were sometimes observed but the total of this incidental crystallization was less than about 10%. In Example 9, magnesium dititanate crystals were observed but in amounts less than about 10% by weight.

Since, as was observed above, the glass-ceramic articles of this invention are highly crystalline, not only is the quantity of the residual glassy matrix small but the composition thereof is quite different from that of the parent glass. Hence, in the preferred embodiment of the invention, essentially all of the magnesium ions will be incorporated into the crystal structure of the beta-quartz and other extraneous crystal phases present in the article resulting in a residual glassy matrix composed principally of silica. Some magnesium ions in excess of those included in the crystal structure can be tolerated but amounts in excess of about 5% by weight often produce a coarse-grained rather than the desired fine-grained glass-ceramic article. It will be evident that these "contaminant" magnesium ions in the residual glass matrix may also be replaced with lithium ions during the ion exchange reaction, but, it is equally apparent that, inasmuch as the number of such ions is very small and the total amount of glass in the article is very minor, the effect of such a replacement upon the overall properties of the article would be substantially negligible when compared with the effect resulting from the exchange undergone within the beta-quartz crystals.

The glass-ceramic cane produced from each example were then assembled into sets of five samples for ion exchange strengthening treatments. These treatments consisted of immersing each set of cane samples into a bath of molten salt composed of 90% by weight $Li_2SO_4$ and 10% by weight $K_2SO_4$, the bath being operated at fixed temperatures of either 800° C. or 850° C.

After removal from the salt bath and cleaning, each cane sample was subjected to a severe form of surface abrasion. In this abrasive treatment, a set of cane samples was mixed with 200 cc. of 30 grit silicon carbide particles and subjected to a tumbling motion for 15 minutes in a Number 0 ball mill jar rotating at 90–100 r.p.m. Each abraded cane sample was then mounted on spaced knife edges in a Tinius Olsen testing machine and subjected to a continuously increasing load intermediate the supports and on the opposite side until the cane broke in flexure. From the measured load required to break each cane, a modulus of rupture (MOR) value was calculated for the individual cane and an average value determined for each set of samples.

Inasmuch as the strength of these articles is directly dependent upon the integral surface compression layer developed therein through the ion exchange process and, since practically all service applications for these articles encounters surface injury thereto even if it be only that conventionally experienced in normal handling and shipping, the useful or permanent strength exhibited by the article is that which remains after considerable surface abrasion. Hence the tumble abrasion test described above was first developed by the glass industry to simulate surface wear which could be suffered by glass articles in actual service and is believed to be equally useful for glass-ceramic articles. To impart reasonably good abraded strength to the articles, the depth of the surface compression layer is preferably at least 0.001″. This depth can be readily measured through electron microscope examination of a cross-section of the article.

The following table indicates each set of samples by the glass number in Table I above and sets forth both the ion exchange treatment given the samples and the average calculated MOR for the set of strengthened and tumble abraded samples. The ion exchange treatment is set forth in terms of time in hours and temperatures in ° C. For comparison, the average MOR for a set of abraded, but untreated, glass-ceramic cane samples is on the order of 10,000 p.s.i.

| Sample: | Temp., °C. | Time, hours | Average MOR×10⁻³ | |
|---|---|---|---|---|
| | | | Abraded | Unabraded |
| 1 | 800 | 4 | 60 | 76 |
| 2 | 800 | 4 | 56 | 97 |
| 3 | 800 | 4 | 60 | 76 |
| 4 | 800 | 4 | 30 | |
| 5 | 850 | 4 | 118 | |
| 6 | 850 | 4 | 152 | |
| 7 | 850 | 4 | 99 | |
| 8 | 850 | 8 | 38 | |
| 9 | 850 | 8 | 155 | |

It will be understood that the foregoing data do not necessarily represent the maximum strengths attainable with the particular materials being treated. For example, a further set of glass-ceramic cane samples having the composition of the first example was treated in essentially the same manner as described above except that the time of immersion in the molten salt bath was 6 hours rather than 4 hours. The average MOR for this set of samples was 76,000 p.s.i., thus indicating that the maximum strength had not been attained in the initial set of samples at least. However, with the illustrative information supplied above, one can readily ascertain by routine experiments the necessary information for any specific application.

Whereas in the above-recited examples a bath of molten $Li_2SO_4$—$K_2SO_4$ was utilized as the source of lithium ions and the use of a bath of molten salt is the preferred manner for carrying out the ion exchange process, it can be appreciated that other sources of lithium ions can be employed which are useful at the temperatures suitable for the invention. Hence, pastes and vapors are well-recognized as sources of exchangeable ions in the conventional ion exchange staining arts. Also, it will be evident that the most rapid rate of exchange and the highest strengths will commonly be accomplished where pure lithium-ion containing materials are employed as the exchange media although some contamination can be tolerated. Since lithium is such a highly mobile ion, the speed of the exchanges can be so rapid that careful control thereof may be difficult. Therefore, a "diluent" ion, such as the potassium ion utilized in the above-reported examples, is included. Nevertheless, the determination of the maximum amount of contamination which can be tolerated is believed to be well within the technical ingenuity of one of ordinary skill in the art.

This invention is grounded on the exchange of lithium ions for magnesium ions in the crystal structure of stuffed beta-quartz. That such an exchange does, indeed, take place is demonstrated through X-ray diffraction analysis of the surface crystals before and after ion exchange process. The substitution of lithium ions for magnesium ions is illustrated in the subsequent table which records several of the $d$-spacings and the intensities observed thereat in an X-ray diffraction pattern made of the surface crystallization of Example 8 prior to and after the ion replacement process. The intensities are arbitrarily denominated as very strong (v.s.), strong (s.), moderate (m.), and weak (w.).

Before exchange

| $d$: | I |
|---|---|
| 4.44 | s. |
| 3.43 | vs. |
| 2.95 | m. |
| 2.57 | m. |
| 2.30 | w. |
| 2.22 | m. |
| 2.06 | m. |
| 1.86 | vs. |
| 1.61 | s. |
| 1.43 | m. |
| 1.40 | m. |

90% $Li_2SO_4$—10% $K_2SO_4$ 8 hours at 850° C.

| $d$: | I |
|---|---|
| 4.55 | s. |
| 3.51 | vs. |
| 2.99 | m. |
| 2.61 | m. |
| 2.34 | w. |
| 2.26 | m. |
| 2.08 | m. |
| 1.88 | vs. |
| 1.63 | m. |
| 1.45 | m. |
| 1.42 | m. |

It is believed that this table clearly indicates the maintenance of the fundamental stuffed beta-quartz crystal structure during the ion exchange process, inasmuch as the peaks in the diffraction pattern which are characteristic of the beta-quartz crystals before the ion exchange are present after the exchange but the spacings and intensities thereof vary somewhat, thus reflecting a distortion and expansion of the structure of the crystal cell but not the destruction hereof, caused by the crowding of two lithium ions into the sites within the crystals previously occupied by a single magnesium ion.

Finally, since magnesium ions are substantially, if not entirely, absent from the residual glassy matrix, the integral surface compression layer developed within the glass-ceramic article must be the result of ion exchange within the crystals in this surface layer. Although, as has been discussed above, stuffed beta-quartz is the predominant crystal phase grown in the glass-ceramic articles of this invention, minor amounts of other crystals can also be present. Nevertheless, inasmuch as the presence of such incidental crystallization can dilute the maximum strengthening effect which can be attained where beta-quartz is the sole crystal phase, it is preferred to restrict the number of any such extraneous crystals to less than about 20% of the total crystallization.

We claim:

1. A unitary glass-ceramic article of high strength having a crystal content of at least 70% by weight of the article with an integral surface compressive stress layer and an interior portion consisting essentially of MgO, $Al_2O_3$, $SiO_2$, $TiO_2$, and/or $ZrO_2$, wherein the crystals of said interior portion consist essentially of beta-quartz stuffed with magnesium ions and the crystals of said surface compressive stress layer consist essentially of beta-quartz stuffed with magnesium ions, the structural nature of said latter beta-quartz crystals being essentially unchanged but in at least a portion of which the molar concentration of magnesium ions is less with a corresponding increase in the molar concentration of lithium ions.

2. A method for making a unitary glass-ceramic article of high strength having a crystal content of at least 70% by weight of the article with an integral surface compression stress layer and an interior portion which comprises contacting a glass-ceramic article consisting essentially of MgO, Al$_2$O$_3$, SiO$_2$, TiO$_2$, and/or ZrO$_2$ wherein the crystal phase therein consists essentially of beta-quartz stuffed with magnesium ions at a temperature between about 800–850° C. with a source of exchangeable lithium ions for a period of time sufficient to replace at least part of the magnesium ions of said beta-quartz in a surface layer of the article with lithium ions on a two lithium ion-for-one-magnesium ion basis, said replacement not changing the essential structural nature of the beta-quartz crystals but thereby effecting an integral compressively stressed surface layer on the article.

3. A method according to claim 2 wherein said glass-ceramic article is contacted with a source of exchangeable lithium ions at a temperature between about 800°–850° C. for about 4–16 hours.

References Cited

UNITED STATES PATENTS

| | | | |
|---|---|---|---|
| 2,779,136 | 1/1957 | Hood et al. | 65—30X |
| 3,282,770 | 11/1966 | Stookey et al. | 65—30X |
| 3,482,513 | 2/1969 | Denman | 65—33X |
| 3,252,811 | 5/1966 | Beall | 65—33X |

S. LEON BASHORE, Primary Examiner

J. H. HARMAN, Assistant Examiner

U.S. Cl. X.R.

65—30, 33